US012746697B2

(12) United States Patent
Sakurai et al.

(10) Patent No.: US 12,746,697 B2
(45) Date of Patent: Sep. 29, 2026

(54) CUTTING IMPLEMENT

(71) Applicant: KYOCERA Corporation, Kyoto (JP)

(72) Inventors: Koji Sakurai, Satsumasendai (JP); Takanori Nishihara, Takatsuki (JP); Keisuke Tsuchiya, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 306 days.

(21) Appl. No.: 18/553,421

(22) PCT Filed: Mar. 28, 2022

(86) PCT No.: PCT/JP2022/015188
§ 371 (c)(1),
(2) Date: Sep. 29, 2023

(87) PCT Pub. No.: WO2022/210604
PCT Pub. Date: Oct. 6, 2022

(65) Prior Publication Data

US 2024/0190029 A1 Jun. 13, 2024

(30) Foreign Application Priority Data

Mar. 31, 2021 (JP) ................................ 2021-062090
Mar. 31, 2021 (JP) ................................ 2021-062091
Mar. 31, 2021 (JP) ................................ 2021-062092

(51) Int. Cl.
*B26B 9/00* (2006.01)
*B23K 26/34* (2014.01)
*B24B 3/54* (2006.01)

(52) U.S. Cl.
CPC ............... *B26B 9/00* (2013.01); *B23K 26/34* (2013.01); *B24B 3/54* (2013.01)

(58) Field of Classification Search
None
See application file for complete search history.

(56) References Cited

U.S. PATENT DOCUMENTS

| | | | | |
|---|---|---|---|---|
| 6,067,784 | A * | 5/2000 | Jordan | B23D 35/001 56/DIG. 17 |
| 6,146,476 | A * | 11/2000 | Boyer | B23K 26/34 219/121.66 |
| 9,393,984 | B2 * | 7/2016 | Culf | B23P 15/40 |
| 10,730,193 | B2 * | 8/2020 | Nishihara | B23K 26/34 |
| 2007/0163128 | A1 | 7/2007 | Tarrerias | |
| 2018/0050434 | A1 | 2/2018 | Nishihara | |

(Continued)

FOREIGN PATENT DOCUMENTS

| | | | |
|---|---|---|---|
| JP | H8-155153 | A | 6/1996 |
| JP | 2007-524520 | A | 8/2007 |

(Continued)

*Primary Examiner* — Hwei-Siu C Payer
(74) *Attorney, Agent, or Firm* — Procopio, Cory, Hargreaves & Savitch LLP

(57) ABSTRACT

In the present disclosure, a cutting implement includes a blade body including a base portion and a cutting edge portion connected to an end portion of the base portion. The base portion includes a first metal, and the cutting edge portion includes a second metal and hard particles having a hardness higher than the hardness of the second metal. The hard particles include first hard particles having a particle size of 20 μm or more and 50 μm or less.

14 Claims, 18 Drawing Sheets

(56) References Cited

U.S. PATENT DOCUMENTS

| | | | | |
|---|---|---|---|---|
| 2018/0056532 | A1 | 3/2018 | Nishihara | |
| 2020/0061747 | A1 * | 2/2020 | Wang | B23D 65/00 |
| 2024/0190029 | A1 * | 6/2024 | Sakurai | B26B 9/00 |

FOREIGN PATENT DOCUMENTS

| | | | |
|---|---|---|---|
| JP | 2018-8074 | A | 1/2018 |
| WO | 2016/190343 | A1 | 12/2016 |

* cited by examiner

CUTTING IMPLEMENT

TECHNICAL FIELD

The present disclosure relates to a cutting implement having excellent wear resistance.

BACKGROUND OF INVENTION

Traditionally, kitchen knives made of a material that contains a metal material as a main component have been used. Among these, in recent years, a kitchen knife made of stainless steel that contains nickel and chromium as components has been widely used. Patent Document 1 describes that titanium carbide particles and stainless steel particles having a high hardness are deposited on a leading end portion of a blade body made of stainless steel, and are simultaneously irradiated with a laser beam to be bonded to the blade body to form a bead, and the bead is ground and polished to make a cutting implement.

CITATION LIST

Patent Literature

Patent Document 1: JP 2007-524520 T

SUMMARY

In the present disclosure, a cutting implement includes a blade body that includes a base portion and a cutting edge portion connected to an end portion of the base portion. The base portion includes a first metal, and the cutting edge portion includes a second metal and hard particles having a hardness higher than the hardness of the second metal. The hard particles include first hard particles having a particle size of 20 μm or more and 50 μm or less.

In the present disclosure, another cutting implement includes a blade body that includes a base portion and a cutting edge portion connected to an end portion of the base portion. The base portion includes a first metal, and the cutting edge portion includes a second metal and hard particles having a hardness higher than the hardness of the second metal. An interface portion having a crystal grain size larger than the crystal grain size of the cutting edge portion is provided between the base portion and the cutting edge portion.

DESCRIPTION OF EMBODIMENTS

Hereinafter, a cutting implement according to an embodiment of the present disclosure will be described. Drawings used in the following description are schematic, and dimensional ratios and the like on the drawings do not always match the actual ones.

Figure 1:
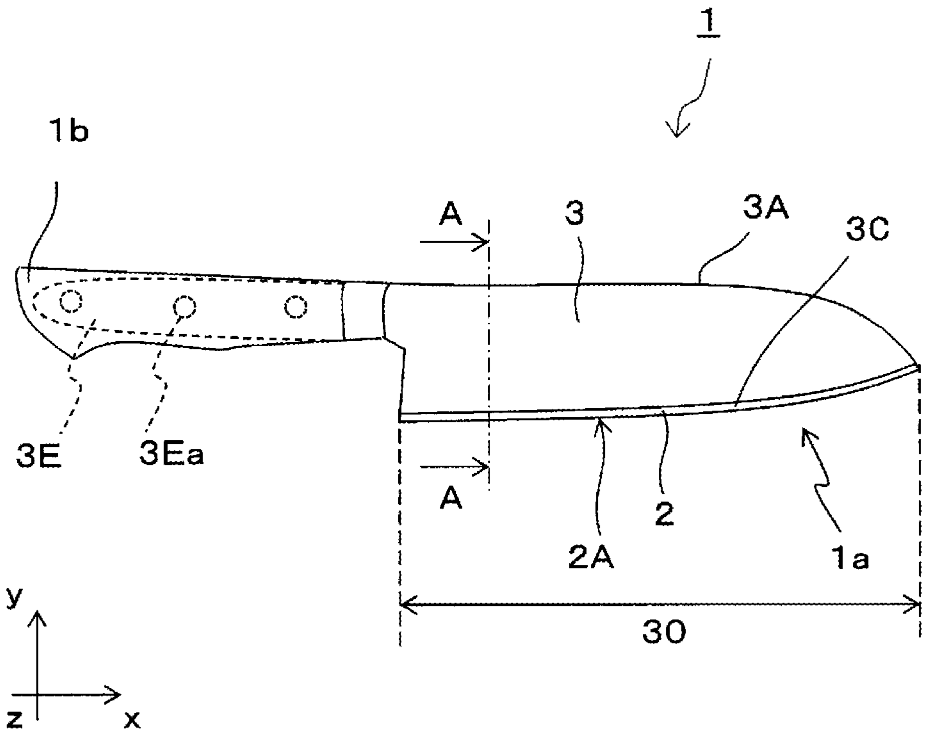
FIG. 1 is a plan view of a cutting implement according to an embodiment of the present disclosure.
Figure 2:
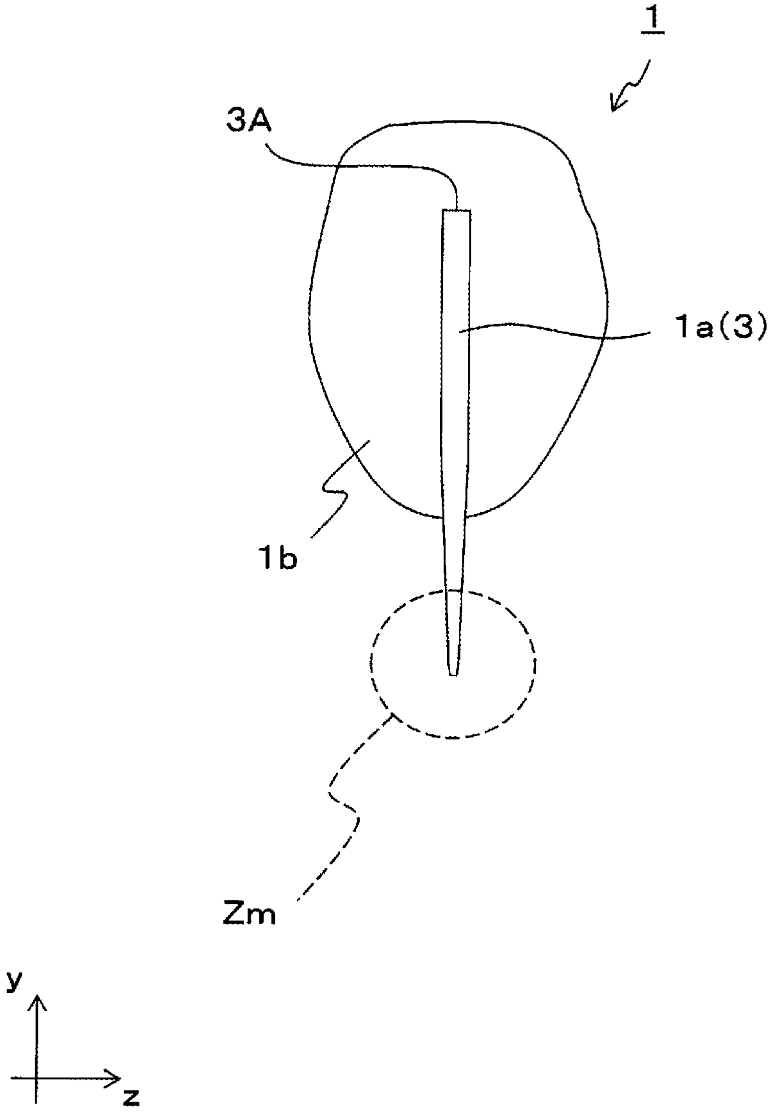
FIG. 2 is a view of the cutting implement of FIG. 1 viewed from the cutting edge side.

As illustrated in FIGS. 1 and 2, a cutting implement 1 of the present disclosure includes a blade body 1*a* and a handle 1*b* connected to the blade body 1*a*. The shape and size of the blade body 1*a* are set in accordance with the application of the cutting implement 1. If the cutting implement 1 is a kitchen knife, examples of the shape of the blade body 1*a* include shapes of a Japanese kitchen knife such as a kitchen knife for cutting fish and a santoku knife, a Western knife such as a butcher knife, or a Chinese knife. If the cutting implement 1 is for an application other than a kitchen knife such as a knife for a surgical instrument, the blade body 1*a* may have any shape as long as the shape is suited to its application.

The handle 1*b* connected to the blade body 1*a* is to be gripped by a hand when a person uses the cutting implement 1. As in the case of the blade body 1*a*, the shape and size of the handle 1*b* are set in accordance with the application of the cutting implement 1.

The blade body 1*a* and the handle 1*b* may be formed integrally or separately. The cutting implement 1 is not limited to including the handle 1*b*, and may be composed of only the blade body 1*a*. In the present embodiment, the blade body 1*a* and the handle 1*b* are separately formed. The blade body 1*a* is partially inserted into the handle 1*b*, and is fixed to the handle 1*b* at the insertion portion. A part of the blade body 1*a* may be welded to the handle 1*b* made of metal.

The handle 1*b* includes wood, resin, ceramic, or a metal material. As the metal material, a rust-resistant material such as a titanium-based or stainless-steel-based material may be used. As the resin, for example, an ABS resin (a copolymer of acrylonitrile, butadiene, and styrene) or a polypropylene resin may be used.

The blade body 1*a* includes a base portion 3 and a cutting edge portion 2 connected to the base portion 3. The base portion 3 includes a first metal. As the first metal, for example, steel, synthetic steel, stainless steel, titanium alloy, or the like may be used. As the synthetic steel, for example, a material including chromium, molybdenum, vanadium, tungsten, cobalt, copper, combinations thereof, or the like may be used. As the stainless steel, chromium-nickel-based stainless steel or chromium-based stainless steel may be used. As the titanium alloy, for example, so-called 64 titanium, which is a titanium alloy including 6% of aluminum (Al) and 4% of vanadium (V), may be used. When the first metal is stainless steel, the corrosion resistance of the base portion 3 against rust or the like can be improved.

In the present embodiment, the first metal is a main component of the base portion 3. Here, a "main component" means a component that accounts for 70 mass % or more of the total of 100 mass % of the components constituting the base portion 3.

As illustrated in FIG. 1, the base portion 3 includes an exposed portion 30 exposed from the handle 1*b* and a tang 3E inserted in the handle 1*b*. In the exposed portion 30, an end portion 3C and a back portion 3A extend along a length direction (x-axis direction) of the exposed portion 30. The exposed portion 30 narrows in width near a leading end in the length direction of the exposed portion 30, and the end portion 3C and the back portion 3A are connected at the leading end of the exposed portion 30. The cutting edge portion 2 is connected to the end portion 3C of the exposed portion 30 along the end portion 3C. The tang 3E is narrower than the exposed portion 30 in a width direction (y-axis direction) and is inserted in the handle 1*b*. In the present embodiment, the tang 3E includes at least one hole portion 3Ea, and a part of the handle 1*b* is inserted into the hole portion 3Ea so that the blade body 1*a* and the handle 1*b* are firmly fixed to each other. Note that the base portion 3 and the handle 1*b* may be integrated by welding.

Figure 3:
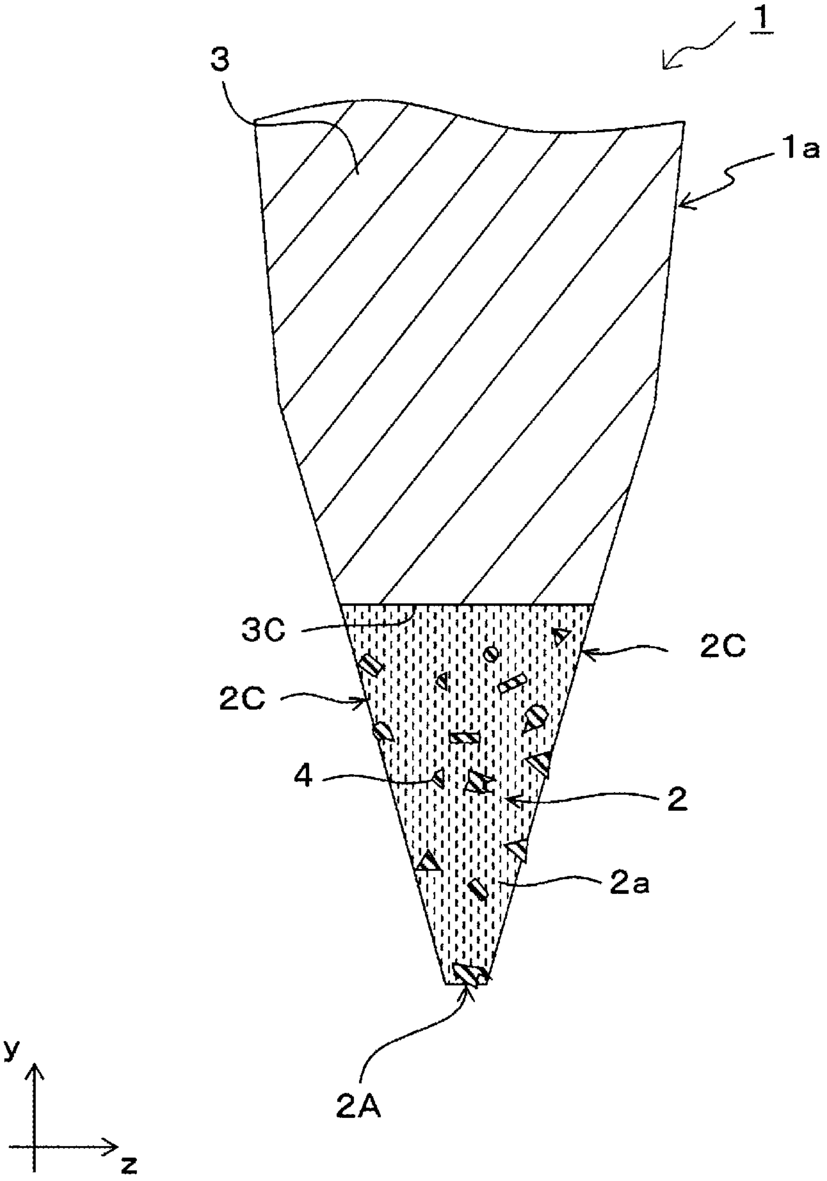
FIG. 3 is an enlarged cross-sectional view of a region Zm in FIG. 2.

As illustrated in FIG. 3, the cutting edge portion 2 includes a second metal 2*a* and a plurality of hard particles 4. The second metal 2*a* may be made of a material different from or the same as the material of the first metal. In the present embodiment, the second metal 2*a* is made of a material different from the material of the first metal. This is advantageous in that a metal material suitable for the cutting edge portion 2 can be selected without being restricted by the material of the base portion 3. As the material of the second metal 2*a*, for example, stainless steel, nickel, titanium, nickel alloy, titanium alloy, or the like can be used, and further, nickel-chromium-iron alloy (for example, Inconel (registered trade mark)), nickel-silicon-boron alloy (for example, Colmonoy (registered trade mark)), or titanium-aluminum-vanadium alloy may be used.

When made of Inconel, the second metal 2*a* has a relatively high corrosion resistance, and can reduce thermal stress remaining in the cutting edge portion 2 when a laser is used in the manufacturing method.

When made of Ni-based Colmonoy, the second metal 2*a* can suppress strength deterioration due to hardening and annealing of the cutting edge during manufacture of the cutting implement 1. The Ni-based Colmonoy is preferably composed of 0.06 mass % or less of carbon, 0.8 mass % or less of iron, 2.4 to 3.0 mass % of silicon, 1.6 to 2.00 mass % of boron, 0.08 mass % or less of oxygen, and the balance of nickel with respect to the total amount of the Ni-based Colmonoy.

In the present embodiment, the second metal 2*a* forms a metallic matrix as a main component of the cutting edge portion 2, and the hard particles 4 are present in this matrix. Here, a "main component" means a component that accounts for 50 mass % or more of the total of 100 mass % of the components constituting the cutting edge portion 2. Since the second metal 2*a* is the main component of the cutting edge portion 2, the durability of the cutting edge portion 2 can be further improved.

The plurality of hard particles 4 included in the cutting edge portion 2 have a higher Vickers hardness than the Vickers hardness of the second metal 2*a* included in the cutting edge portion 2. Thus, the hardness of the entire cutting edge portion 2 can be increased, and the wear resistance of the cutting edge portion 2 can be improved. Since the hard particles 4 are made of a material harder than the second metal 2*a*, the sharpness of the cutting edge portion 2 against an object is improved by the hard particles 4 coming into contact with the object during the use of the cutting implement 1.

In the present embodiment, the hard particles 4 are made of a material that is harder than the second metal 2*a* and also harder than the first metal. As described above, by using the hard particles 4 having a sufficient hardness, an effect of improving the sharpness and the wear resistance of the cutting edge portion 2 can be enhanced. The hard particles 4 may have, for example, a Vickers hardness of 1000 Hv or more and 4000 Hv or less. The Vickers hardnesses of the hard particles 4, the first metal, and the second metal 2*a* can be measured using a method according to JIS Z 2244 (ISO 6507-2, the same applies hereinafter).

The hard particles 4 are preferably exposed on a surface of the cutting edge portion 2. In order for the hard particles 4 to be easily exposed on a surface of the cutting edge portion 2 even when the cutting edge portion 2 is polished, the hard particles 4 are preferably dispersed not only in a length direction (x-axis direction) and a width direction (y-axis direction) of the base portion 3 but also in a thickness direction (z-axis direction) of the base portion 3 inside the cutting edge portion 2.

Examples of the hard particles 4 include a cemented carbide alloy including tungsten carbide (WC), and a cermet including titanium carbide (TiC), titanium nitride (TiN), tantalum carbide (TaC), and vanadium carbide (VC). As the hard particles 4, a plurality of materials such as tungsten carbide, titanium carbide, and the like may be mixed and used.

Figure 5:
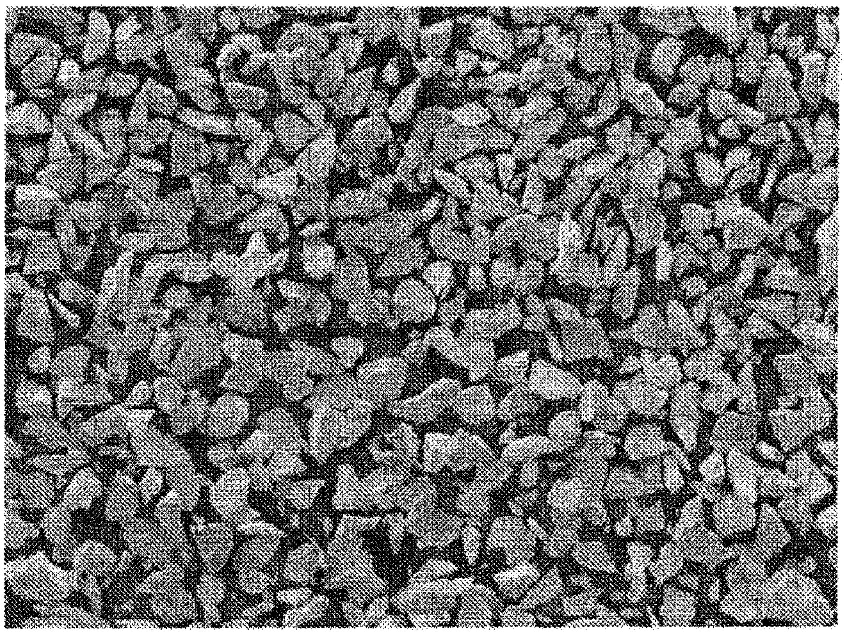
FIG. 5 is a scanning electron microscope (hereinafter referred to as SEM) photograph (magnification: 100 times) of tungsten carbide (WC) powder used as a raw material for the hard particles.

The hard particles 4 preferably include first hard particles 41 having an angular polyhedral shape (see FIG. 8B), whereby the wear resistance of the cutting edge portion 2 can be improved. Specifically, examples of the shape of the hard particles 4 include a polygonal shape such as a triangular shape, a quadrangular shape, and a trapezoidal shape in a cross-sectional view. However, as illustrated in FIG. 5 to be described later, the hard particles 4 having an angular irregular shape can also be used. FIG. 5 illustrates the shapes of the raw material powder of the hard particles 4.

Preferably, the first hard particles 41 having an angular polyhedral shape and a particle size of 20 μm or more and 50 μm or less are included in the matrix of the second metal 2*a* at an area ratio of 3% or more in cross section. The first hard particles 41 having such a relatively large particle size are susceptible to cracking. However, in the present disclosure, since the first hard particles 41 are present in the matrix of the second metal 2$a$, the growth of cracks can be suppressed by the matrix, and thus the hard particles 4 having a relatively large particle size can be used. Here, when the particle size of the first hard particles 41 is 20 μm or more, the wear resistance is improved. On the other hand, when the particle size is 50 μm or less, the occurrence of cracks in the first hard particles 41 can be suppressed. In order to set the particle size of the first hard particles 41 as described above, for example, particles having a particle size of less than 20 μm and particles having a particle size of more than 50 μm may be screened out by using a sieve.

Note that the percentage of particles at an area ratio in a cross section is measured by calculating a region of hard particles by using the software "Image J".

As described above, the hard particles 4 preferably include particles (first hard particles 41) having a particle size (average particle size, the same applies hereinafter) of 20 μm or more and 50 μm or less. When the hard particles 4 include particles having a particle size of 20 μm or more, the wear resistance is improved. On the other hand, when the hard particles 4 include particles having a particle size of 50 μm or less, the occurrence of cracks in the hard particles 4 can be suppressed.

The hard particles 4 may include particles (second hard particles 42 to be described later) having a particle size of 2 μm or more and 10 μm or less. When such fine hard particles 42 are dispersed in the cutting edge portion, the strength of the cutting edge portion is improved and the wear resistance is also improved.

The hard particles 4 may include particles (third hard particles 43 to be described later) crystallized in a dendritic shape from the matrix of the second metal 2$a$. The anchor effect of such dendritic particles can suppress degranulation of the hard particles 43.

The hard particles 4 may be included in the cutting edge portion 2 in an amount of 10 mass % or more. In that case, the hard particles 4 having a particle size outside of the range of 20 μm or more and 50 μm or less may be included, but the hard particles 4 having a particle size of 20 μm or more and 50 μm or less are preferably included at an area ratio of 3% or more in a cross section as described above. Accordingly, the sharpness and the wear resistance of the cutting edge portion 2 can be further improved. The hard particles 4 may be included in the cutting edge portion 2 in an amount of 50 mass % or less. In that case, the productivity of the cutting edge portion 2 can be maintained at a high level. At this time, the content of the hard particles 4 having a particle size of 20 μm or more and 50 μm or less is preferably 32% or less as an area ratio in cross section.

Note that the content of the hard particles 4 can be obtained by observing a cross section (a cross section parallel to a yz plane) of the cutting edge portion 2 using an SEM and calculating a ratio of a total area of the hard particles 4 to an area of the entire cutting edge portion 2 as area percentage based on a photograph of the observed image.

A cross section of the blade body 1$a$ (a cross section parallel to a yz plane) will be described with reference to FIG. 3. The cutting edge portion 2 includes a cutting edge 2A and a pair of side surfaces 2C disposed on both sides of the cutting edge 2A and connected to the cutting edge 2A. At least one of the plurality of hard particles 4 is exposed from the side surfaces 2$c$ of the cutting edge portion 2. Accordingly, when an object is cut by using the cutting implement 1, the hard particles 4 come into contact with the object. As a result, the sharpness of the cutting edge portion 2 is improved and the wear resistance of the cutting edge portion 2 can be improved.

In the present embodiment, at least one of the hard particles 4 is preferably exposed from the cutting edge 2A. Accordingly, when an object is cut by using the cutting implement 1, the hard particles 4 exposed from the cutting edge 2A come into contact with the object, and the sharpness of the cutting edge 2A can be improved.

A method for manufacturing the cutting implement 1 will be described with reference to FIG. 4. The method for manufacturing the cutting implement 1 includes: a step of preparing the base portion 3 including the first metal; a step of preparing a metal powder 2$a$1 constituting the second metal and the hard particles 4; a step of forming a build-up portion 6 for forming the cutting edge portion 2 including the second metal as a main component and the plurality of hard particles 4 by spraying the metal powder 2$a$1 and the hard particles 4 to the end portion 3C of the base portion 3 and baking the metal powder 2$a$1; and a step of polishing the build-up portion 6 or polishing the build-up portion 6 and the base portion 3. The steps will be described in order below.

Figure 4A:
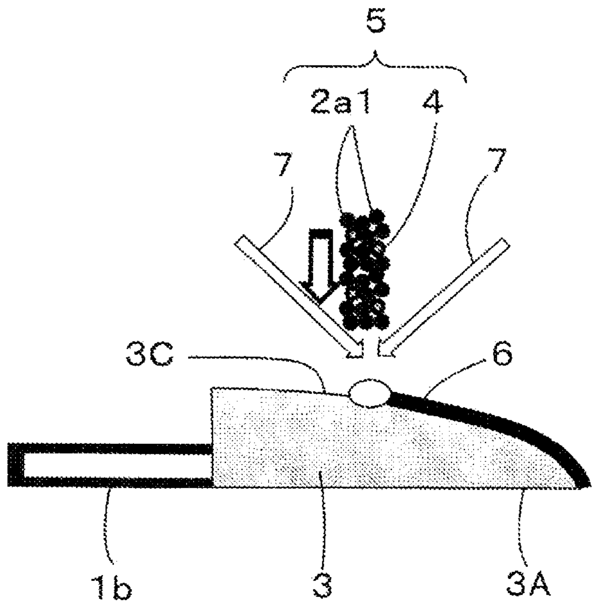
FIG. 4A is an explanatory diagram illustrating a build-up process for forming a cutting edge portion on a base portion of the cutting implement.
Figure 4B:
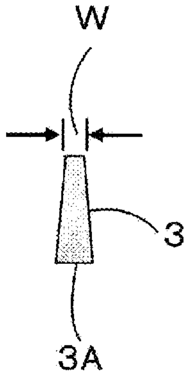
FIG. 4B is a front view of the base portion illustrated in FIG. 4A.

First, the base portion 3 including the first metal is prepared. The base portion 3 has a shape as illustrated in FIGS. 4A and 4B. The hardness of the base portion 3 can be increased by pressing a plate of stainless steel or another material, punching out a predetermined blade shape, and then performing quenching.

On the other hand, separately from the preparation of the base portion 3, metal powder constituting the second metal and raw material powder forming the hard particles 4 are prepared. FIG. 5 illustrates the shapes of tungsten carbide (WC) powder as an example of the raw material powder forming the hard particles 4. As illustrated in the FIG. 5, the raw material powder of the hard particles 4 preferably includes ground products that have been ground to have a particle size of 20 μm or more and 50 μm or less and to have angular surfaces.

As illustrated in FIG. 4A, while a powder-particle mixture 5 of the metal powder 2$a$1 and the hard particles 4 is sprayed onto the end portion 3C of the base portion 3, the metal powder 2$a$1 is baked onto the end portion 3C. Accordingly, the build-up portion 6 for forming the cutting edge portion 2 including the second metal 2$a$ and the plurality of hard particles 4 is formed.

The metal powder 2$a$1 is preferably melted and baked by laser. That is, a cladding technique using laser is preferably used. Specifically, as illustrated in FIG. 4A, the powder-particle mixture 5 (cladding material) including the metal powder 2$a$1 is supplied onto the end portion 3C while the vicinity of the end portion 3C of the base portion 3 is irradiated with a laser beam 7 indicated by the arrows. In this state, the base portion 3 is moved relative to the irradiation position of the laser beam 7 along a length direction (x direction illustrated in FIG. 1) of the base portion 3. Accordingly, the powder-particle mixture 5, which is a material constituting the cutting edge portion 2, can be melted and metallically bonded over the entire length of the end portion 3C. As described above, the powder-particle mixture 5 is irradiated with the laser beam 7 (two laser beams in the present embodiment), whereby the powder-particle mixture 5 is melted and the build-up portion 6 is formed on the end portion 3C of the base portion 3. Thus, the base portion 3 is less likely to be melted, and a molten pool is suppressed. Preferably, an inert gas is blown to the end portion 3C from outside of the powder-particle mixture 5. This makes it easier for the powder-particle mixture 5 to be hit by the laser beam 7. An example of the inert gas is argon gas. As illustrated in FIG. 4B, a width W of the end portion 3C of the base portion 3 is preferably 0.3 mm or more and 1.0 mm or less, but is not particularly limited because the width W varies depending on the size of the cutting implement or the like.

When the powder-particle mixture 5 is irradiated with the laser beam 7, the powder-particle mixture 5 excluding the hard particles 4 is melted and adheres to the end portion 3C. On the other hand, the hard particles 4 have a high melting point, and thus are not likely to be melted by the laser beam 7. Therefore, when the powder-particle mixture 5 is melted, the build-up portion 6 in which the plurality of hard particles 4 are dispersed can be obtained at the cutting edge portion 2. As will be described later, the hard particles 4 are partially solid-dissolved into the matrix during a build-up process, and the hard particles 4 are crystallized from the matrix, which has become a supersaturated solid solution.

Figure 6:
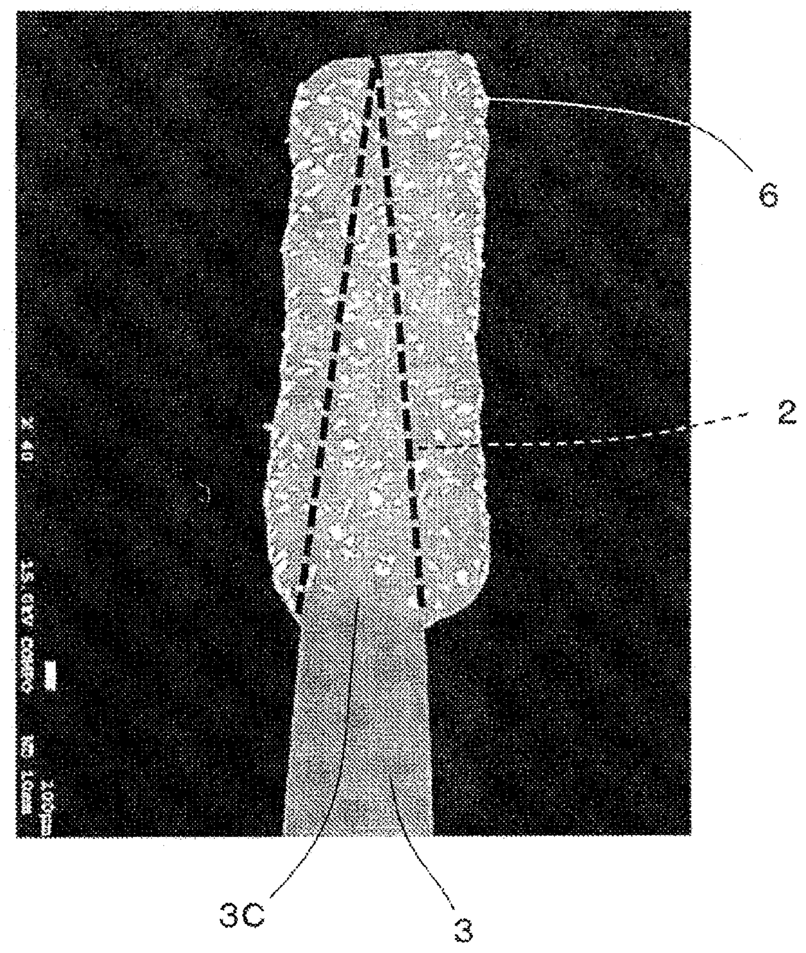
FIG. 6 is an SEM photograph showing a state in which a build-up portion for forming a cutting edge portion is formed on an end portion of the base portion by the method illustrated in FIG. 4.

FIG. 6 is an SEM photograph showing an example of the build-up portion 6 formed on the end portion 3C of the base portion 3 as described above.

The cutting edge portion 2 is formed on the end portion 3C of the base portion 3 by polishing a part of the build-up portion 6. Only the build-up portion 6 may be polished, or a part of the base portion 3 may be polished in addition to the build-up portion 6. Polishing can be performed by using a polishing stone having a surface coated with, for example, aluminum oxide ($Al_2O_3$), silicon carbide (SiC) or diamond, mixed particles of silicon carbide (SiC) or diamond. Polishing may be performed in a plurality of steps.

Figure 7:
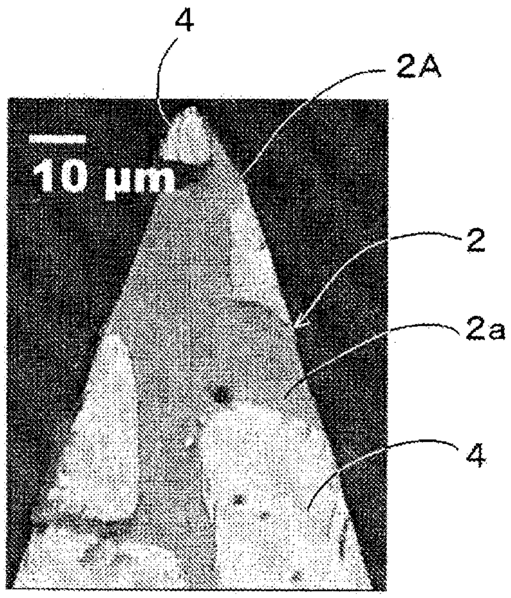
FIG. 7 is an SEM photograph showing a cutting edge portion after sharpening.

FIG. 7 is an SEM photograph showing the cutting edge 2A of the cutting edge portion 2 made as described above. As is apparent from the drawing, the hard particles 4 are exposed at the leading end and both side surfaces of the cutting edge 2A. Thus, when an object is cut, the hard particles 4 come into contact with the object, whereby the sharpness of the cutting edge portion 2 with respect to the object is improved.

In FIGS. 6 and 7, the materials used are as follows.

Base portion 3: Stainless steel

Build-up portion 6 (cutting edge portion 2): Ni alloy

Hard particles 4

Composition: Ceramic including tungsten carbide as a main component

Mesh particle size: 45 μm

Content in the build-up portion 6: 30 mass %

Figure 8A:
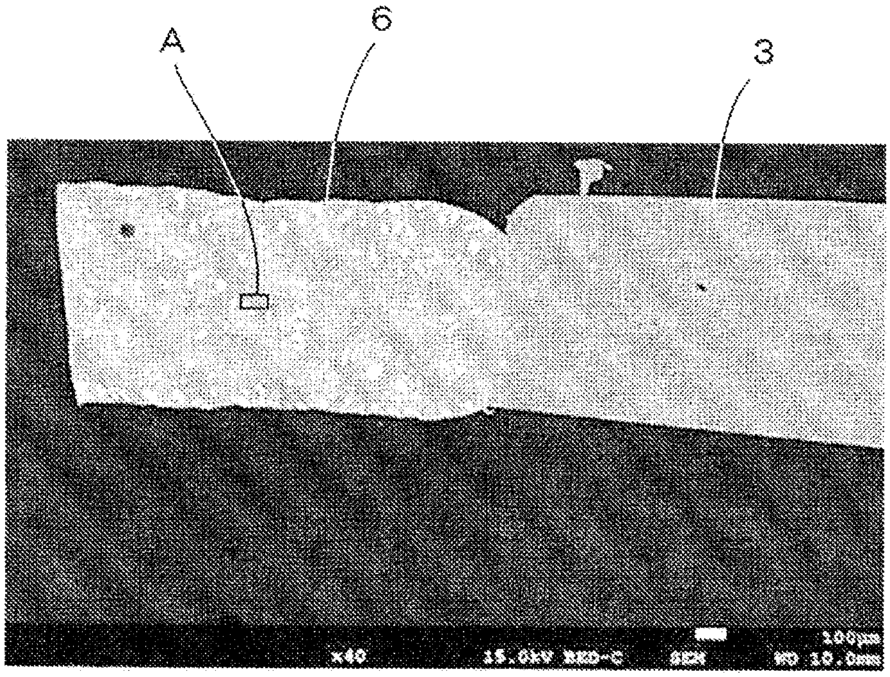
FIG. 8A is an SEM photograph (magnification: 40 times) showing the cutting edge portion after sharpening.
Figure 8B:
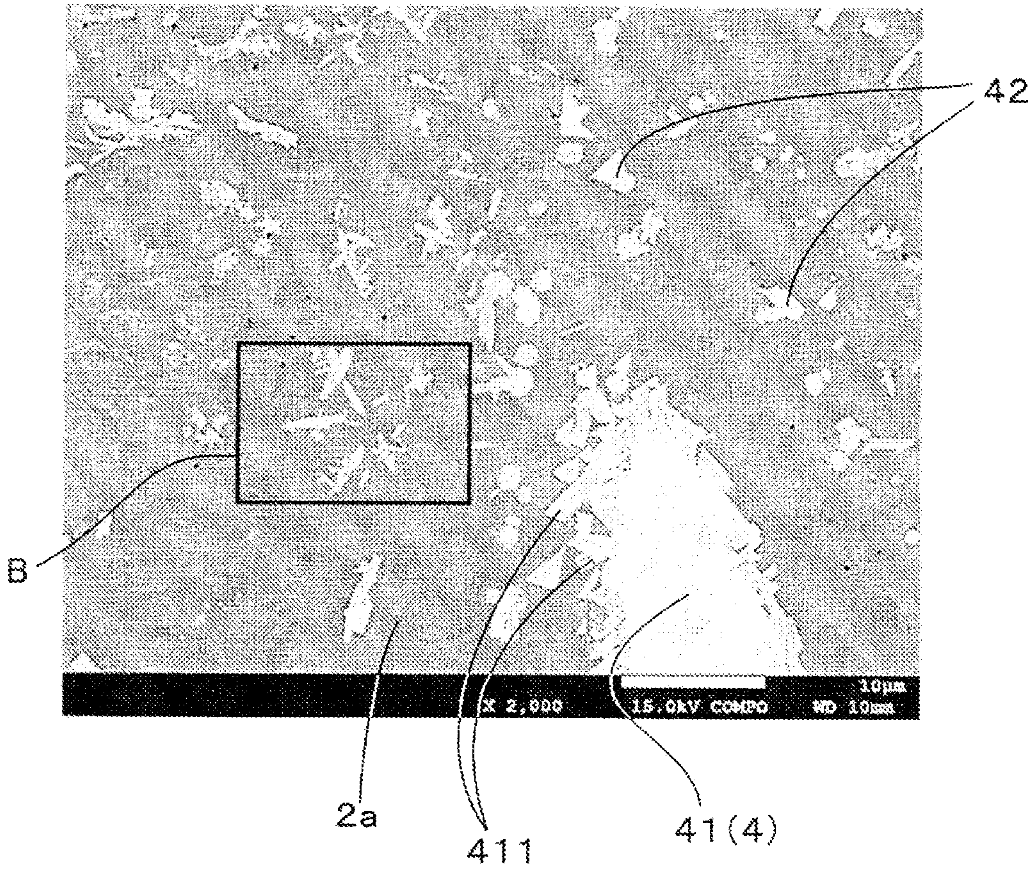
FIG. 8B is an enlarged SEM photograph (magnification: 2000 times) of the portion A in FIG. 8A.
Figure 9:
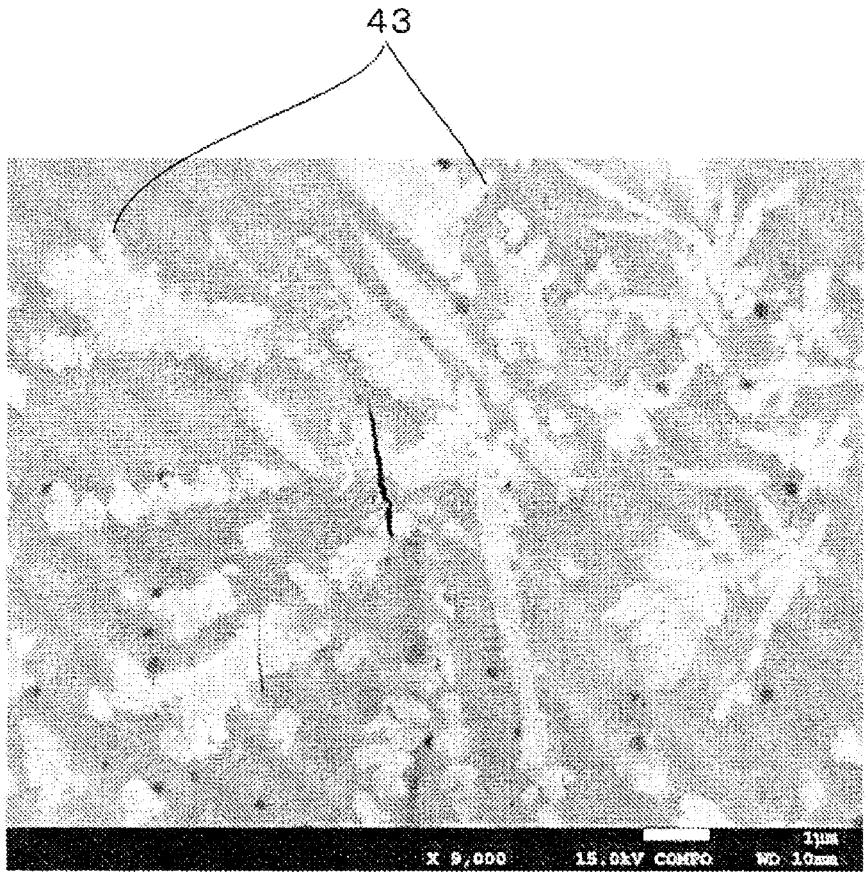
FIG. 9 is an enlarged SEM photograph (magnification: 9000 times) of the portion B in FIG. 8B.

FIG. 8A is an SEM photograph showing the build-up portion 6 formed in the same manner as the build-up portion 6 illustrated in FIG. 6, and FIG. 8B is an enlarged SEM photograph of the portion A in FIG. 8A. FIG. 9 is an enlarged SEM photograph of the portion B in FIG. 8B. FIG. 8B and FIG. 9 illustrate that three types of first, second, and third hard particles 41, 42, and 43 having different shapes are present in the build-up portion 6.

The first hard particles 41 have a particle size of 20 μm or more and 50 μm or less, and have an angular polyhedral shape. The first hard particles 41 retain the shape of the raw material powder of the hard particles (WC) to some extent. The presence of the first hard particles 41 being coarse in size as described above improves the wear resistance of the cutting edge portion 2.

As illustrated in FIG. 8B, in the vicinity of the first hard particles 41, a large number of needle-shaped hard particles 411 are precipitated from the peripheries of the first hard particles 41, whereby the concentration of the hard particles in the matrix of the second metal 2*a* becomes high (that is, the surface area of the hard particles becomes large). With the presence of the needle-shaped hard particles 411, the anchor effect of the first hard particles 41 being coarse in size is exerted, and degranulation of the hard particles 41 can be suppressed, thereby enabling long-term use.

The first hard particles 41 are formed in such a manner that the hard particles 4 having a raw material powder size are not melted while being processed and are present as is in the build-up portion.

The second hard particles 42 are fine hard particles having a particle size of 2 μm or more and 3 μm or less. When the second hard particles 42 which are fine in size as described above, are dispersed in the matrix of the second metal 2*a*, the strength of the cutting edge portion 2 is improved and the wear resistance is improved. The second hard particles 42 are assumed to have been obtained in such a manner that the raw material powder is ground to be fine and dispersed. The second hard particles 42 are formed by grinding hard particles having a raw material powder size while being processed.

The third hard particles 43 are illustrated in FIG. 9 which is an enlarged view of the portion B in FIG. 8B. That is, the third hard particles 43 are the hard particles 4 partially crystallized in a dendritic shape from the matrix of the second metal 2*a*. This is presumably due to a part of the raw material powder of the hard particles 4 being solid-dissolved into the matrix of the second metal 2*a* during the build-up process and being crystallized in a dendritic shape from the matrix when the matrix which became a supersaturated solid solution was cooled. When the third hard particles 43 are crystallized in a dendritic shape, an anchor effect can be expected, and degranulation of the third hard particles 43 can be suppressed.

In the present embodiment, the first, second, and third hard particles 41, 42, and 43 are present in the build-up portion 6. This is presumed because the raw material powder of the hard particles 4 has a relatively large particle size, the hard particles are likely to be ground, and the energy during the processing locally has enough power to melt the hard particles. Not all the three types of hard particles 41, 42, and 43 need to be present in one build-up portion 6, but at least one type out of the hard particles 41, 42, and 43 needs to be present.

Figure 10:
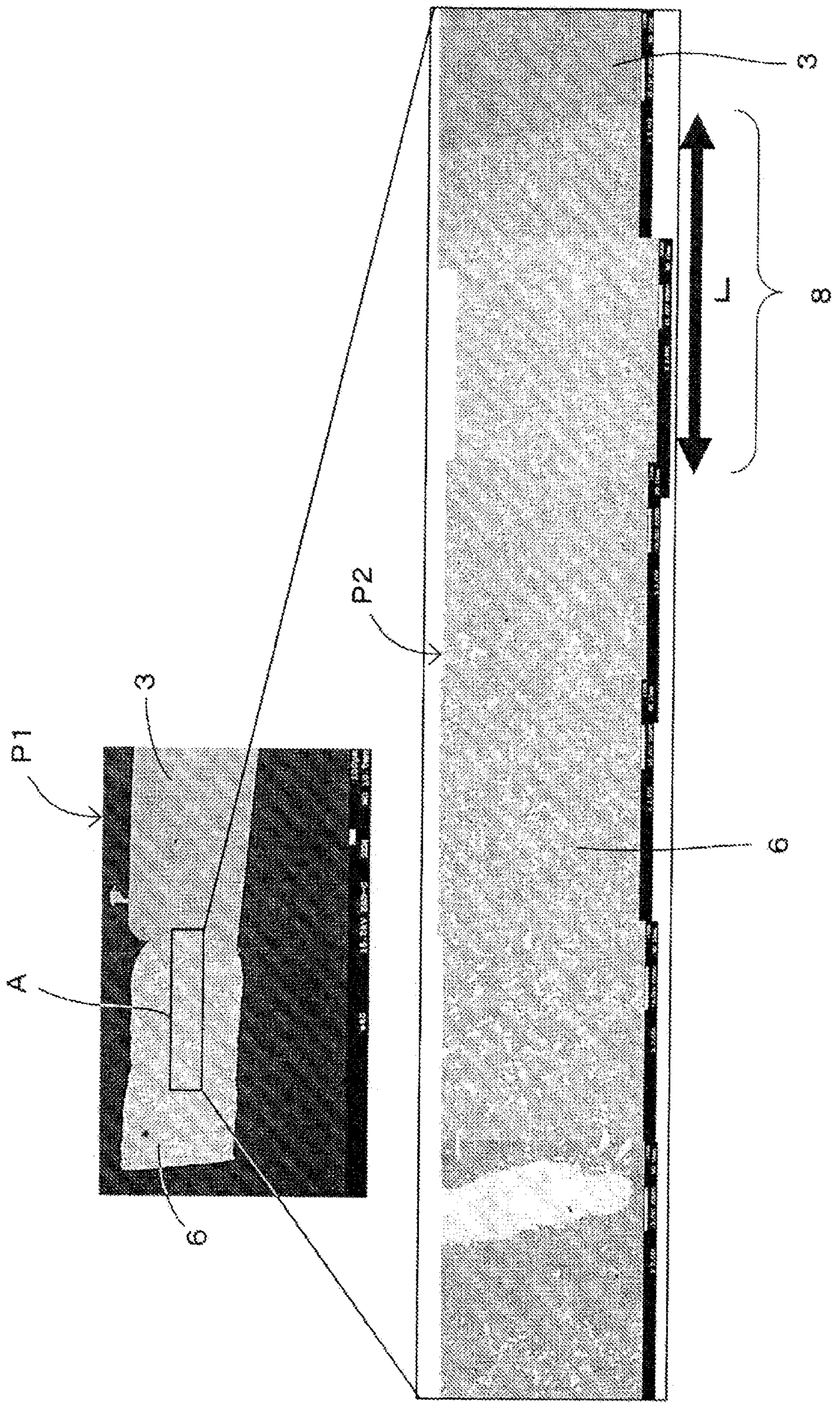
FIG. 10 is an SEM photograph showing a boundary region between the base portion and the build-up portion.

FIG. 10 is an SEM photograph (magnification: 2000 times) for showing in detail the structure of a boundary region between the base portion 3 and the build-up portion 6. The SEM photograph P2 is an enlarged view of the portion A of the SEM photograph P1 and is shown by connecting a plurality of SEM photographs (magnification: 2000 times).

As is apparent from FIG. 10, an interface portion 8, which has a crystal grain size larger than the crystal grain size of the cutting edge portion 2, is formed between the base portion 3 and the build-up portion 6. Preferably, the crystal grains of the interface portion 8 have an average crystal grain size of 1.2 times or more and an area ratio of the crystal grains of 2 times or more as compared with the crystal grains of the cutting edge portion 2. The crystal grain size can be calculated by using image analysis software. In the analysis, the area per crystal is calculated by dividing the total area of crystals by the number of the crystals, and the diameter of a crystal is calculated as the crystal grain size based on the area per crystal under the assumption that the crystal is circular.

It is assumed that the crystal grains are coarsened in the interface portion 8 as described above because the base portion 3 is heated by the irradiation of the laser beam 7, and thus the cooling rate becomes lower toward the vicinity of the boundary between the base portion 3 and the build-up portion 6 than in the interior of the build-up portion 6 after the build-up process. A length L of the interface portion 8 is preferably about 10 μm or more and 200 μm or less with respect to the entire length of the build-up portion 6.

Figure 11:
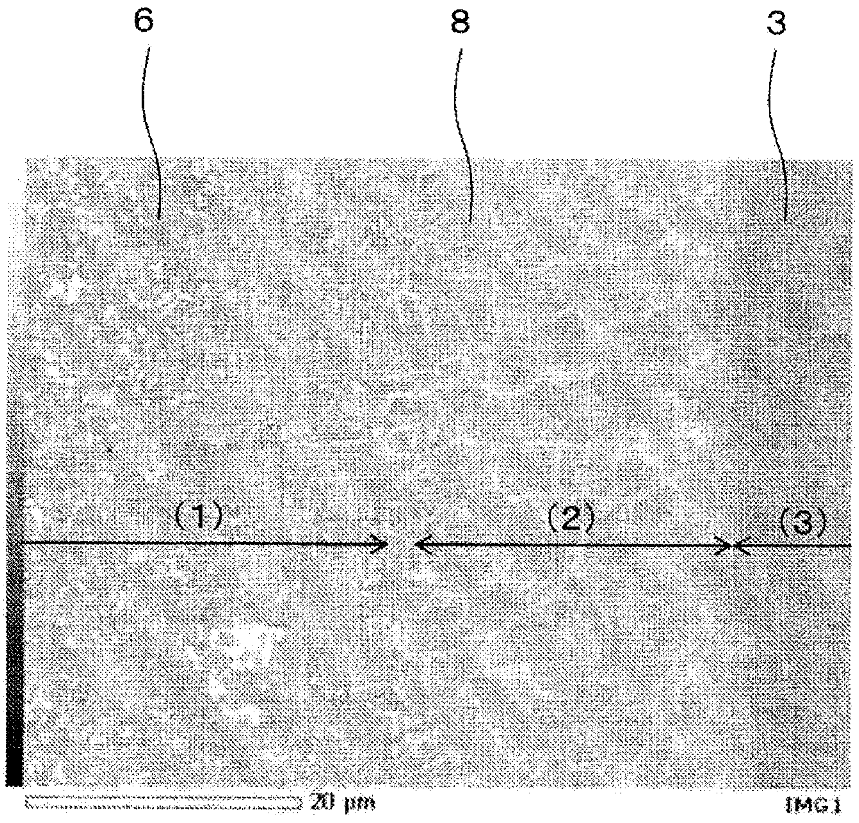
FIG. 11 is an enlarged SEM photograph showing an interface portion interposed between the base portion and the build-up portion.

FIG. 11 is an enlarged SEM photograph showing the interface portion 8. Composition analysis was performed by energy dispersive X-ray spectroscopy (SEM) on a region (1) of the build-up portion 6, a region (2) of the interface portion 8, and a region (3) of the base portion 3 illustrated in the drawing. The results are shown in Table 1.

TABLE 1

| Region | Fe | Ni | Cr | W | Si |
|---|---|---|---|---|---|
| (1) | 20.7 | 54.8 | 3.4 | 18.4 | — |
| (2) | 52.7 | 25.7 | 9.5 | 9.8 | — |
| (3) | 82.6 | — | 14.6 | — | 0.6 |

It can be seen from Table 1 that, in the region (2) of the interface portion 8, iron (Fe) mainly dispersed from the base portion 3 forms a Ni—Fe alloy phase.

In the present embodiment, preferably, after the build-up portion 6 is formed by the laser beam 7, heat treatment such as annealing of the cutting edge, which is performed in a normal manufacturing process for a cutting tool, is not performed, or a mild heat treatment is performed. This is because the interface portion 8 may disappear, resulting in a uniform structure, and the hardness in the interface portion 8 to be described later may not decrease. Therefore, the heat treatment such as annealing is preferably performed before the build-up portion 6 is formed by the laser beam 7.

Figure 12A:
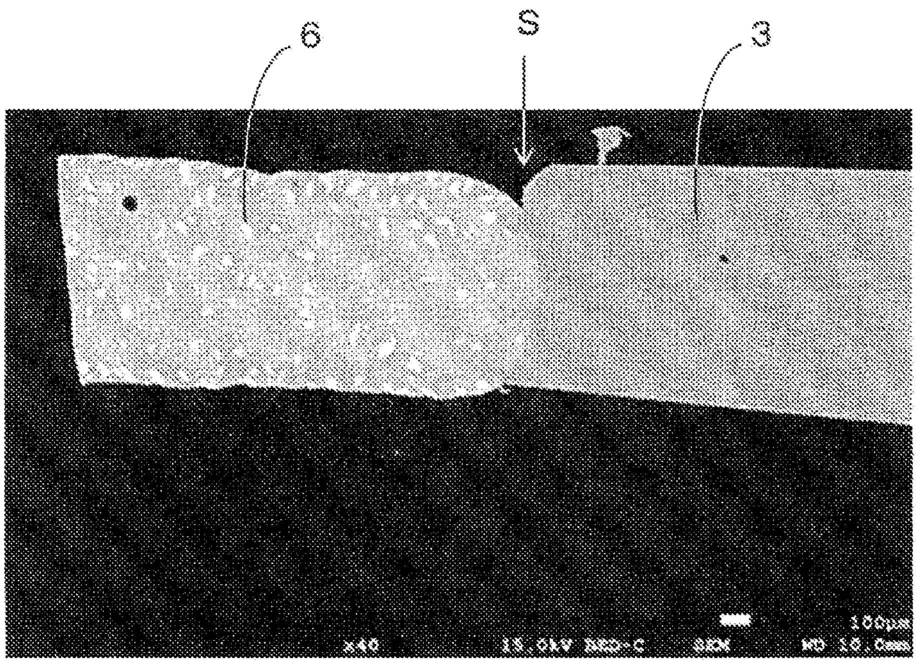
FIG. 12A is an SEM photograph showing a direction of continuous measurement of Vickers hardness.
Figure 12B:
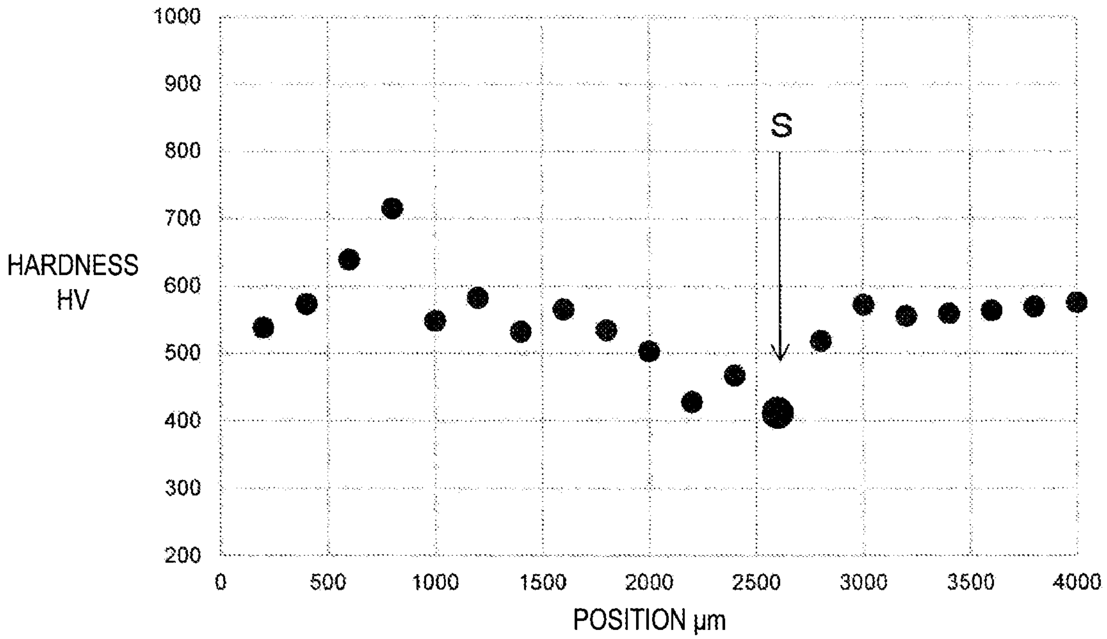
FIG. 12B is a graph showing a measurement result of Vickers hardness distribution.

As illustrated in FIGS. 12A and 12B, a Vickers hardness distribution from the build-up portion 6 to the base portion 3 was measured. Specifically, first, the base portion 3 and the build-up portion 6 were cut in a direction perpendicular to the x-axis direction illustrated in FIG. 1 and parallel to a cutting edge direction (y-axis direction) of the cutting edge portion 2. In the cross section of the cut portion, Vickers hardnesses were measured from a leading end of the build-up portion 6 toward the base portion 3. The measurement was performed by a method according to JIS Z 2244. The measurement conditions are as follows.

Test force: 5 kg

Measurement pitch: 200 μm

The measurement result of the Vickers hardness distribution is illustrated in FIG. 12B. In FIGS. 12A and 12B, the arrow S indicates the position of the interface portion 8 which is a vicinity of the boundary between the build-up portion 6 and the base portion 3. The Vickers hardness at the position of the arrow S was 412 HV, which was the lowest hardness. The length L (see FIG. 10) of the interface portion 8 in this example was 70 μm.

Since the hardness of the interface portion 8 is low as described above, the toughness of the boundary region between the cutting edge portion and the base portion 3 in the cutting implement 1 is high. As a result, when the cutting implement 1 is used or the like, the interface portion 8 serves as a so-called buffer against an impact applied to the cutting implement 1, and thus cracking or breakage of the cutting edge portion 2 can be reduced, which is advantageous in increasing the life of the cutting implement 1. In order to achieve such an effect, the Vickers hardness of the interface portion 8 is suitably 400 HV or more and 450 HV or less.

Figure 13:
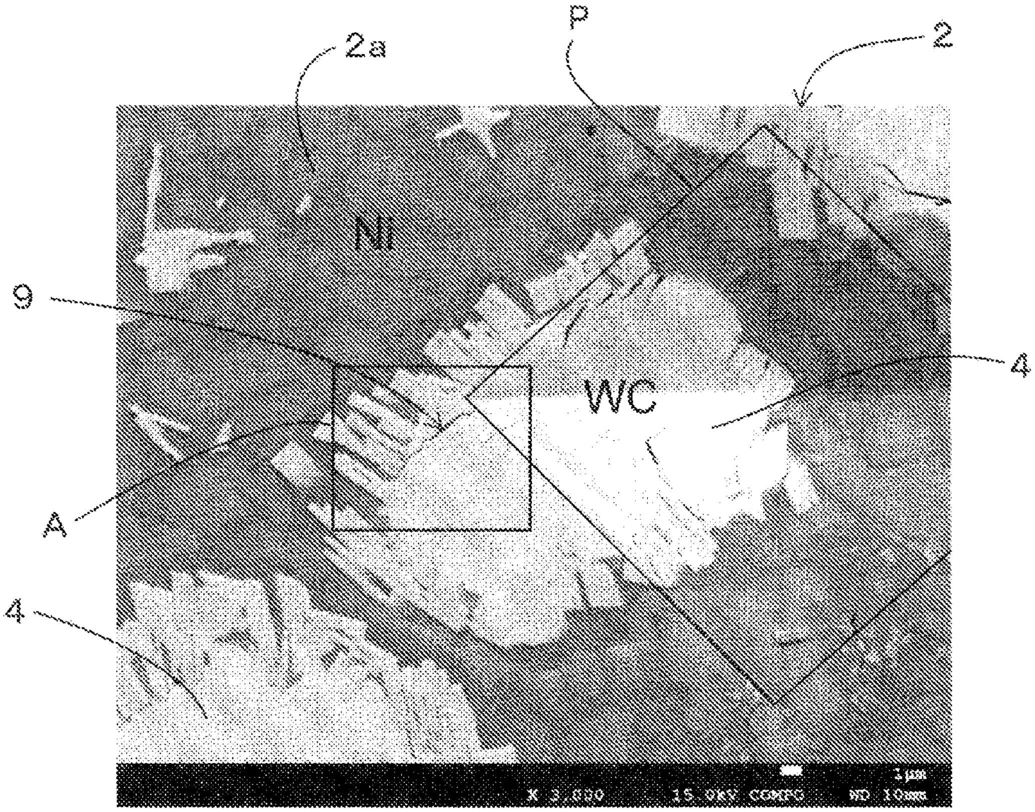
FIG. 13 is an enlarged SEM photograph (magnification: 3000 times) showing a cross section of the cutting edge portion in which an indentation for measuring Vickers hardness is formed.

FIG. 13 is an enlarged SEM photograph showing a surface of the cutting edge portion 2 in which the hard particles 4 having an angular surface are present in the matrix in the second metal 2*a*. FIG. 13 illustrates a state in which an indentation P for Vickers hardness measurement is formed in the surface of the cutting edge portion 2. The indentation P for Vickers hardness measurement refers to a depression obtained by pressing a rigid body (indenter) (not illustrated) of diamond into a surface of a target portion (here, the cutting edge portion 2). Since the indenter has a shape of an inverted regular quadrangular pyramid, the indentation P formed has a substantially square shape. Here, the test force which is the load for pressing the indenter was 5 kg.

Figure 14:
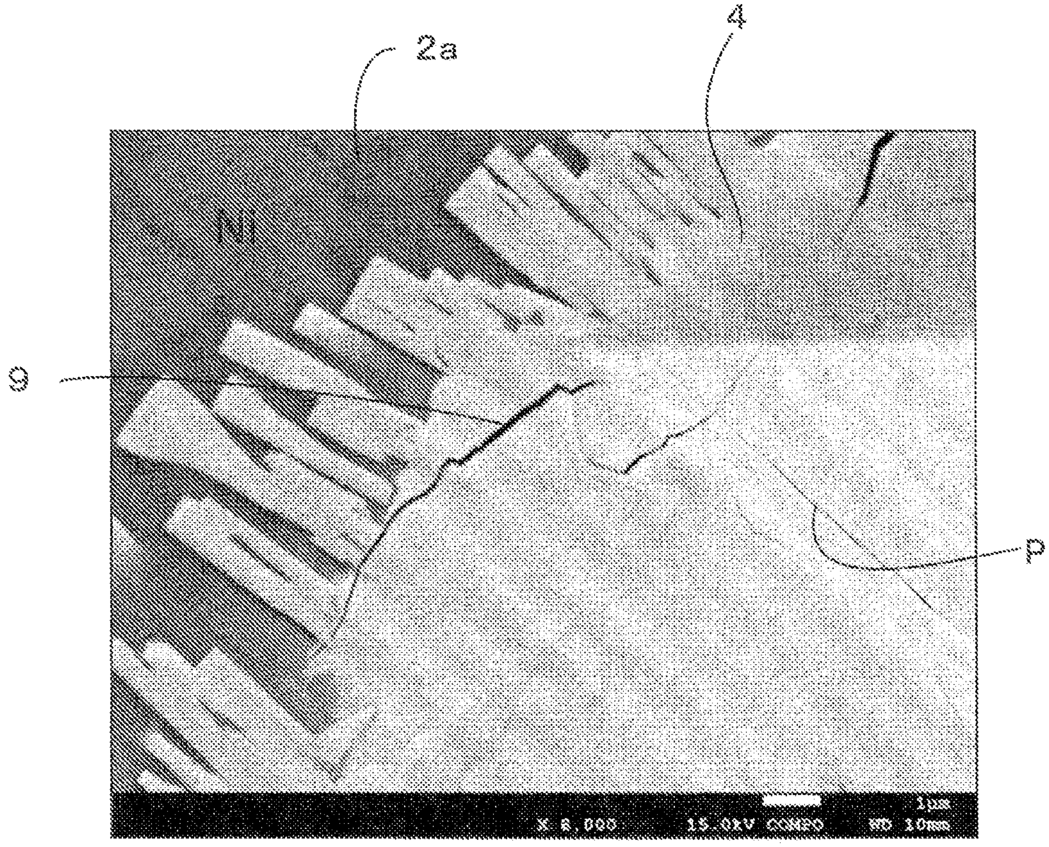
FIG. 14 is an enlarged SEM photograph (magnification: 8000 times) of the portion A in FIG. 13.

As illustrated in FIG. 13, a crack 9 was generated in the hard particles 4 when the indenter was pushed in. FIG. 14 is an enlarged SEM photograph showing the portion A of FIG. 13, that is, a region where the crack 9 was generated. As illustrated in FIG. 14, the crack 9 propagates from an end portion of the indentation P and stops at the matrix of the second metal 2*a*. This is assumed because the second metal 2*a* has a low hardness and a high toughness.

Figure 15:
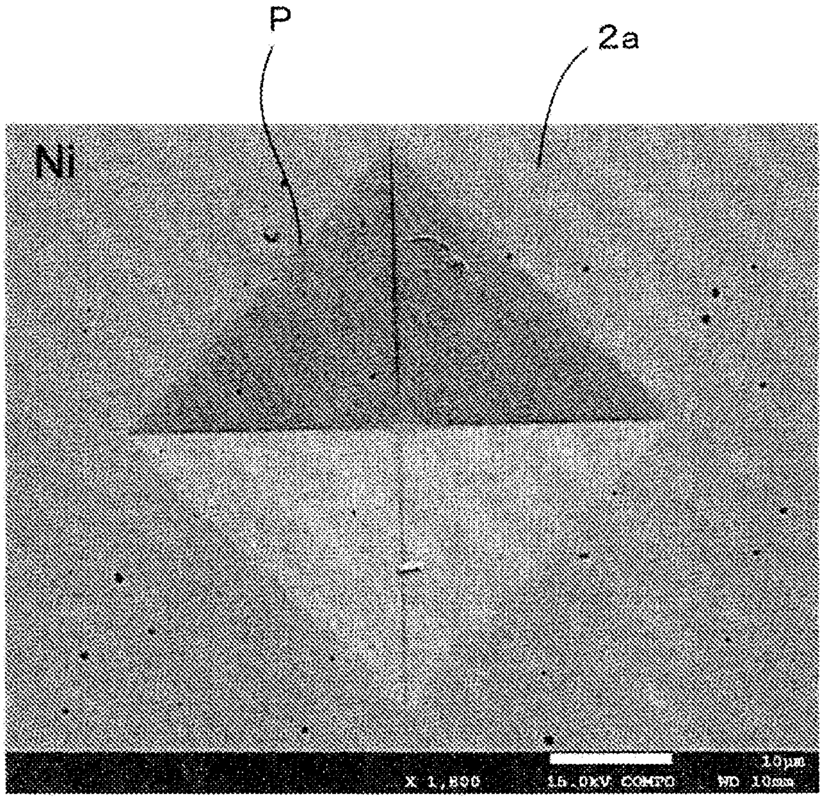
FIG. 15 is an SEM photograph (magnification: 1800 times) showing a state in which an indentation for measuring Vickers hardness is formed in nickel (Ni) used as a second metal.

As illustrated in FIG. 15, even when the indenter for the Vickers hardness measurement was pressed against nickel (Ni) as the second metal 2*a* to form an indentation P', no crack was observed.

The embodiment of the present disclosure has been described above, but the cutting implement according to the present disclosure is not limited thereto, and various changes and improvements can be made within the range set forth in the present disclosure.

REFERENCE SIGNS

1 Cutting implement
1*a* Blade body
1*b* Handle
2 Cutting edge portion
2*a* Second metal
2*a*1 Metal powder
2*c* Side surface
2A Cutting edge
3 Base portion
3A Back portion
3C End portion
3E Tang
4 Hard particle
41 First hard particle
42 Second hard particle
43 Third hard particle
5 Powder-particle mixture
6 Build-up portion
7 Laser beam
8 Interface portion
9 Crack
30 Exposed portion
P, P1, P2 SEM photograph

The invention claimed is:

1. A cutting implement comprising a blade body, the blade body comprising a base portion and a cutting edge portion connected to an end portion of the base portion, the base portion including a first metal, the cutting edge portion including a second metal and hard particles having a hardness higher than a hardness of the second metal, and an interface portion being provided between the base portion and the cutting edge portion, the interface portion having a crystal grain size larger than a crystal grain size of the cutting edge portion.

2. The cutting implement according to claim 1, wherein crystal grains of the interface portion have an average crystal grain size of 1.2 times or more than an average crystal grain size of crystal grains of the cutting edge potion, and crystal grains of the interface portion have an area ratio of the crystal grains of 2 times or more than an area ratio of the crystal grains of the cutting edge portion.

3. The cutting implement according to claim 1, wherein the interface portion has a hardness lower than a hardness of the cutting edge portion.

4. The cutting implement according to claim 3, wherein the interface portion has a Vickers hardness of 400 HV or more and 450 HV or less.

5. The cutting implement according to claim 1, wherein the first metal contains iron (Fe), the second metal contains nickel (Ni), and the interface portion has a composition of Fe—Ni.

6. The cutting implement of claim 1, wherein the hard particles comprise first hard particles having a particle size of 20 μm or more and 50 μm or less.

7. The cutting implement according to claim 6, wherein at and near the first hard particles, needle-shaped hard particles are precipitated from peripheries of the first hard particles.

8. The cutting implement according to claim 6, wherein the hard particles comprise second hard particles having a particle size of 2 μm or more and 10 μm or less.

9. The cutting implement according to claim 6, wherein the hard particles comprise third hard particles crystallized in a dendritic shape from a matrix of the second metal.

10. The cutting implement according to claim 6, wherein the first hard particles are contained in a matrix of the second metal at an area ratio of 3% or more in cross section.

11. The cutting implement according to claim 6, wherein the second metal is stainless steel, nickel, titanium, a nickel alloy, or a titanium alloy.

12. The cutting implement according to claim 6, wherein the hard particles are solid-dissolved in the second metal.

13. The cutting implement according to claim 6, wherein the hard particles are ground products.

14. The cutting implement according to claim 6, wherein each of the first hard particles has an angular polyhedral shape.

* * * * *